United States Patent
Garcia et al.

(10) Patent No.: US 8,414,005 B2
(45) Date of Patent: Apr. 9, 2013

(54) MULTI-CYCLE APPARATUS WITH CENTER-BASED HANDLEBARS

(76) Inventors: Joe Estrada Garcia, Morongo, CA (US); Daniel Garcia, Alta Loma, CA (US)

(*) Notice: Subject to any disclaimer, the term of this patent is extended or adjusted under 35 U.S.C. 154(b) by 20 days.

(21) Appl. No.: 13/101,080

(22) Filed: May 4, 2011

(65) Prior Publication Data

US 2012/0280468 A1 Nov. 8, 2012

(51) Int. Cl.
*B62K 1/00* (2006.01)
(52) U.S. Cl.
USPC ............................. 280/205; 280/274
(58) Field of Classification Search .................. 280/274, 280/205, 208, 263, 270, 266
See application file for complete search history.

(56) References Cited

U.S. PATENT DOCUMENTS

| | | | | |
|---|---|---|---|---|
| 86,235 A * | 1/1869 | Laubach | .................. | 280/263 |
| 246,031 A * | 8/1881 | Otto | .................. | 280/205 |
| 550,399 A * | 11/1895 | Anderson | .................. | 280/205 |
| 633,746 A * | 9/1899 | Anderson | .................. | 280/266 |
| 1,288,809 A * | 12/1918 | Benson | .................. | 280/7.17 |
| 3,399,742 A * | 9/1968 | Malick | .................. | 180/21 |
| 3,437,351 A * | 4/1969 | Newbern | .................. | 280/205 |
| 4,198,072 A * | 4/1980 | Hopkins | .................. | 280/267 |
| 4,279,429 A * | 7/1981 | Hopkins et al. | .................. | 280/267 |
| 4,655,469 A * | 4/1987 | Whelan | .................. | 280/208 |
| 4,746,132 A * | 5/1988 | Eagan | .................. | 280/1.13 |
| 5,261,686 A * | 11/1993 | Buckler | .................. | 280/274 |
| 5,328,194 A * | 7/1994 | Buckler | .................. | 280/202 |
| 5,856,727 A * | 1/1999 | Schroeder et al. | .................. | 315/55 |
| 5,868,413 A * | 2/1999 | Cabrera | .................. | 280/205 |
| D483,821 S * | 12/2003 | Yang | .................. | D21/662 |
| 6,659,488 B1 * | 12/2003 | Beresnitzky et al. | .................. | 280/282 |
| 7,074,169 B2 * | 7/2006 | Hristov | .................. | 482/148 |
| 7,537,229 B1 * | 5/2009 | Wu | .................. | 280/205 |
| D641,667 S * | 7/2011 | Ryan et al. | .................. | D12/111 |
| 2007/0158117 A1 * | 7/2007 | Alexander | .................. | 180/21 |
| 2008/0197599 A1 * | 8/2008 | Comstock et al. | .................. | 280/266 |

* cited by examiner

*Primary Examiner* — Tashiana Adams
(74) *Attorney, Agent, or Firm* — Daniel Castro

(57) ABSTRACT

Aspects for a multi-cycle apparatus are disclosed. In one aspect, an apparatus is provided, which includes a seat, a steering column below the seat, and a handle bar coupled to the steering column in which the handle bar extends behind the seat. In another aspect, an apparatus includes a rear bicycle frame, a steering column coupled to the rear bicycle frame, and a handle bar extending from the steering column. For this embodiment, the steering column is positioned under a seat attached to the rear bicycle frame, and the handle bar wraps around the rear of the seat. Another apparatus is provided, which includes a rear bicycle frame, a steering column coupled to the rear bicycle frame, and a handle bar coupled to the steering column. Here, the steering column is below a seat attached to the rear bicycle frame, and the handle bar extends behind the seat.

20 Claims, 16 Drawing Sheets

MULTI-CYCLE APPARATUS WITH CENTER-BASED HANDLEBARS

TECHNICAL FIELD

The subject disclosure generally relates to a multi-cycle apparatus, and more specifically to a multi-cycle apparatus having handlebars extending from a centralized position.

BACKGROUND

By way of background concerning conventional multi-cycle apparatuses (e.g., bicycles, tricycles, etc.), it is noted that such apparatuses often include various undesirable structural characteristics. For instance, conventional bicycles are structured to include a frame in which a steering column is attached to a front portion of the frame substantially away from a centralized seat. Conventional bicycles thus require riders to straddle a center portion of the frame, which makes mounting such bicycles particularly difficult for some riders. Straddling a bicycle may also undesirably result in injuries to a rider's groin in the event of an accident. Furthermore, by positioning the steering column substantially away from a centralized seat, conventional bicycles undesirably require riders to reach away from their body to steer such bicycles.

Accordingly, it would be desirable to design a multi-cycle apparatus which overcomes these limitations. To this end, it should be noted that the above-described deficiencies are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In accordance with one or more embodiments and corresponding disclosure, various non-limiting aspects are described in connection with a multi-cycle apparatus having center-based handlebars. In one such aspect, a multi-cycle apparatus is provided, which includes a seat, a steering column, and a handle bar. Within such embodiment, the steering column is substantially below the seat, and the handle bar is coupled to the steering column. Furthermore, for this particular embodiment, at least a portion of the handle bar extends behind a midpoint of the seat.

In another aspect, a bicycle apparatus is provided, which includes a rear bicycle frame, a steering column coupled to the rear bicycle frame, and a handle bar extending from the steering column. Here, it is contemplated that the steering column is positioned substantially under a seat attached to the rear bicycle frame. For this embodiment, it is also contemplated that the handle bar wraps around a rear portion of the seat.

In a further aspect, another bicycle apparatus is provided, which includes a rear bicycle frame, a steering column, and a handle bar. Within such embodiment, the steering column is coupled to the rear bicycle frame such that the steering column is substantially positioned directly below a seat attached to the rear bicycle frame. The handle bar is then coupled to the steering column so that at least a portion of the handle bar extends behind a midpoint of the seat.

Other embodiments and various non-limiting examples, scenarios and implementations are described in more detail below.

BRIEF DESCRIPTION OF THE DRAWINGS

Various non-limiting embodiments are further described with reference to the accompanying drawings in which.

DETAILED DESCRIPTION

Overview

As discussed in the background, conventional multi-cycle apparatuses include various undesirable structural characteristics. The various embodiments disclosed herein are directed towards overcoming such limitations by providing a multi-cycle apparatus with a centralized steering mechanism. Namely, a multi-cycle apparatus is disclosed which desirably excludes a center portion of a frame. By excluding such center portion, the disclosed embodiments disclose a novel structure which facilitates steering from an area proximate to a rider, and which facilitates mounting/riding without having to straddle the multi-cycle apparatus.

Figure 1:
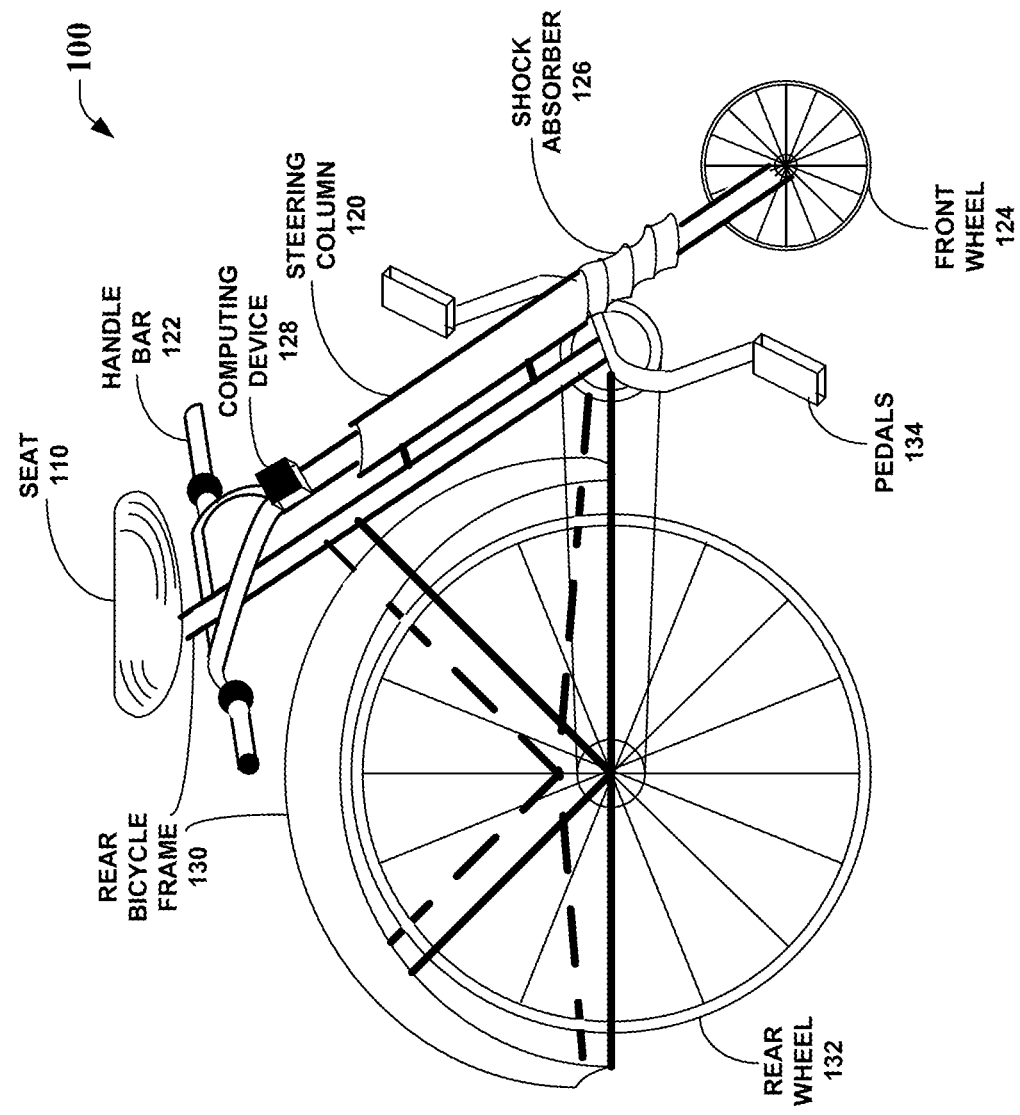
FIG. 1 illustrates an exemplary multi-cycle apparatus according to an embodiment.

Referring first to FIG. 1, an exemplary multi-cycle apparatus is provided according to an embodiment. In an aspect, multi-cycle apparatus 100 includes seat 110, steering column 120, handle bar 122, and rear bicycle frame 130, which may be coupled as shown. Moreover, for this particular embodiment, steering column 120 is coupled to rear bicycle frame 130, wherein seat 110 is affixed atop a shaft that extends in a substantially vertical direction from within rear bicycle frame 130, and wherein handle bar 122 attaches to a top end of steering column 120. In various aspects, unlike conventional bicycles in which steering columns are positioned substantially in front of a rider, it is contemplated that steering column 120 is positioned directly below seat 110. Furthermore, rather than having handle bars extend from a steering column substantially in front of a rider, handle bar 122 extends from a centralized position below the rider which facilitates steering multi-cycle apparatus 100 from a region proximate to seat 110.

As illustrated, in addition to handle bar 122, steering column 120 may further include front wheel 124 coupled to shock absorber 126. In an aspect, it is contemplated that minimizing obstructions directly in front of a rider may be desirable. Accordingly, for some embodiments, a size of front wheel 124 may be chosen which is substantially smaller than wheels on conventional bicycles.

In a further aspect, it should be appreciated that rear bicycle frame 130 includes rear wheel 132 and pedals 134, which is substantially similar to the rear portion of conventional bicycles. Nevertheless, although multi-cycle apparatus 100 is illustrated within the context of a bicycle embodiment, it is contemplated that other multi-cycle embodiments may also be implemented without departing from the scope and spirit of the instant invention. For instance, rather than utilizing rear bicycle frame 130 it is contemplated that a rear portion of a tricycle frame can be utilized as well.

As illustrated, multi-cycle apparatus 100 may also include computing device 128. Within such embodiment, it is contemplated that computing device 128 can perform any of various computing operations including, for example, tracking any of a plurality of biometrics (e.g., calories burned, heart rate, etc.), as well as any of a plurality of other metrics (e.g., distance traveled, speed, GPS location, etc.). For some riders, it should be noted that determining which apparatus-specific parameters (e.g., handle bar position, wheelbase width, seat height, etc.) yield particularly optimal results (e.g., heart rate, speed, etc.) may be desirable. To facilitate such determination, it may be beneficial for computing device 128 to exchange data with external devices (e.g., personal digital assistant, server, personal computer, etc.) via a wireless network (e.g., Bluetooth, WiFi, etc.). Accordingly, it is contemplated that various types of data can be stored, received, and/or transmitted via computing device 128. Furthermore, although computing device 128 is shown attached to steering column 120, it should be appreciated that computing device 128 can be attached to any portion of multi-cycle apparatus 100 (e.g., seat 110, handle bar 122, etc.).

Exemplary Handle Bar Embodiments

Various exemplary non-limiting handle bar embodiments are now disclosed. To this end, it is noted that the embodiments described herein are not intended to be exhaustive, and that one of ordinary skill will appreciate that various undisclosed embodiments also fall within the scope and spirit of the instant invention.

In an aspect, it is contemplated that differently configured handle bars may be desired for different people/uses. To facilitate such desirability, the multi-cycle apparatus disclosed herein may include a mechanism for interchanging different handle bars. For example, handle bars may be interchanged by inserting a desired handle bar into the steering column.

Figure 2:
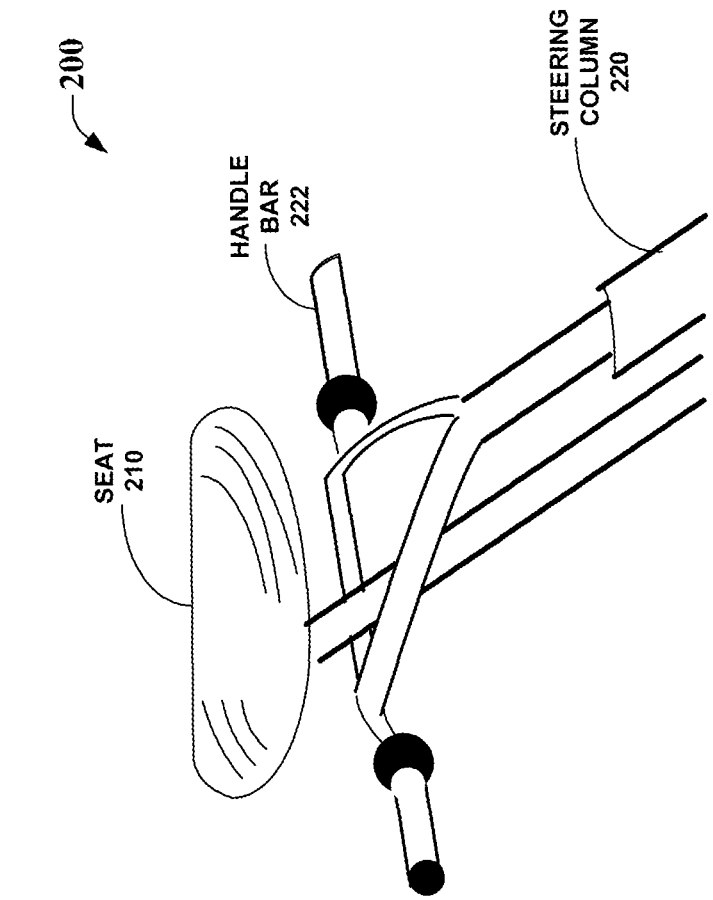
FIG. 2 illustrates an exemplary handle bar in a default position according to an embodiment.

Referring next to FIG. 2, an exemplary handle bar in a default position is provided according to an embodiment. As illustrated, default configuration 200 includes handle bar 222 coupled to steering column 220, wherein handle bar 222 is proximate to a rear portion of seat 210. For this particular embodiment, rather than having riders bend forward to steer, default configuration 200 thus allows riders to simply lean back for handle bar 222. Accordingly, for riders who may have difficulty bending forward, default configuration 200 provides a desirable alternative in which steering is achieved from a substantially upright position.

Figure 3:
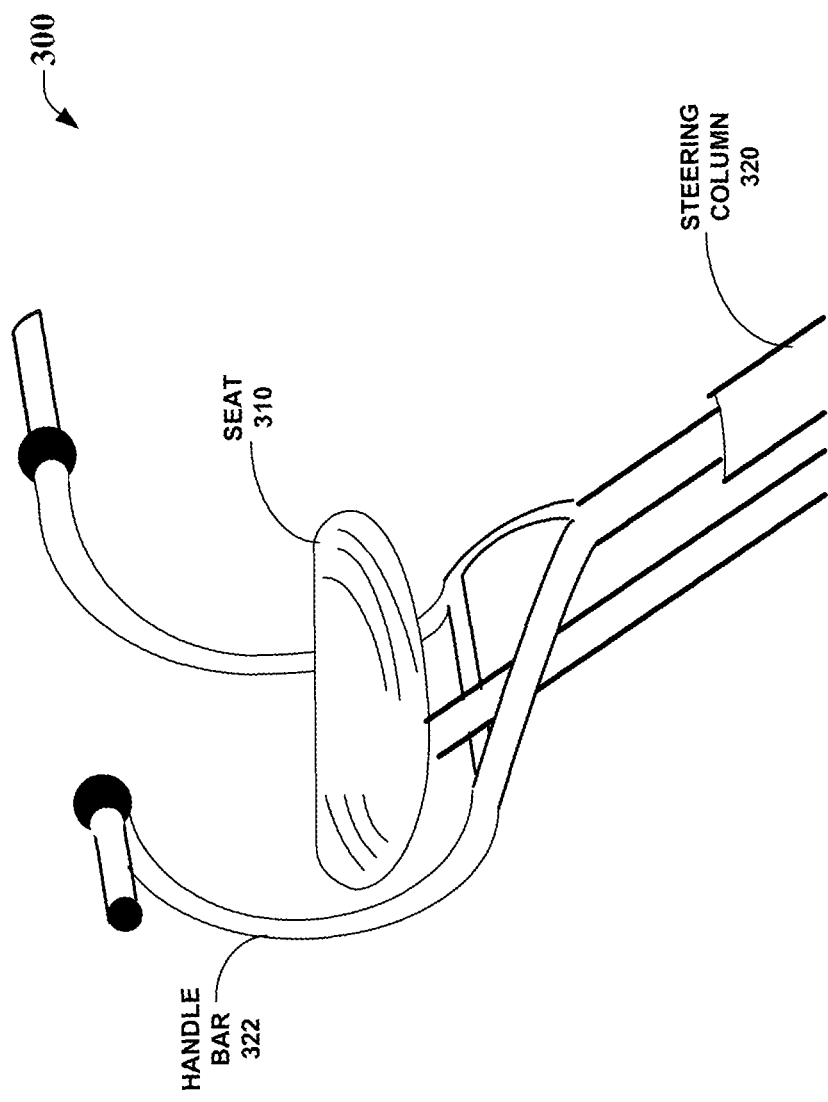
FIG. 3 illustrates an exemplary handle bar in a vertical position according to an embodiment.

In another aspect, an embodiment is disclosed in which handle bars are configured to extend vertically from default configuration 200. In FIG. 3, for instance, an exemplary handle bar in a vertical position is provided according to an embodiment. As illustrated, vertical configuration 300 includes handle bar 322 coupled to steering column 320, wherein handle bar 322 wraps behind a rear portion of seat 310 to a vertical position substantially above the default position. Accordingly, rather than having riders steer by bending forward (as in conventional bicycles) or reach back (as in default configuration 200), vertical configuration 300 enables riders to steer from a substantially upright position in which handle bar 322 is proximate to the rider's torso. In a particular embodiment, it should be appreciated that handle bar 322 may be further configured to include "forearm rests" (not shown) to facilitate a more comfortable steering of vertical configuration 300.

Figure 4:
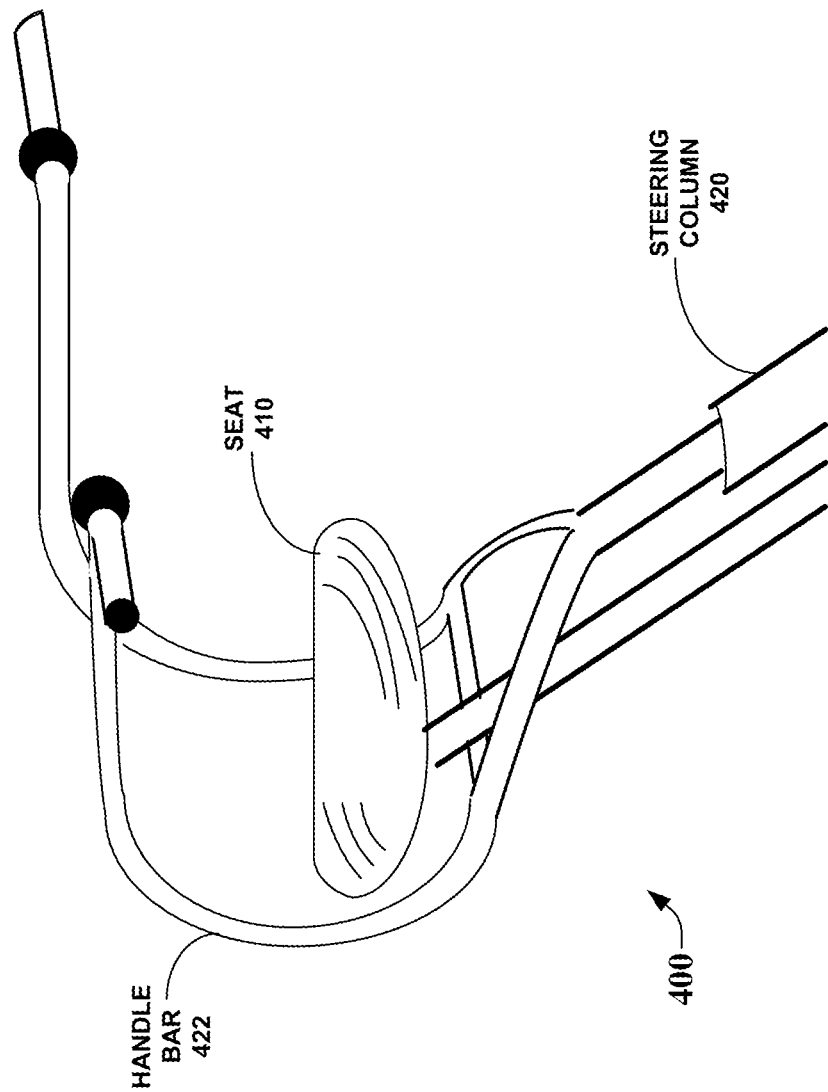
FIG. 4 illustrates an exemplary handle bar in a forward position according to an embodiment.

In yet another aspect, an embodiment is disclosed in which handle bars are configured to extend forward from vertical configuration 300. In FIG. 4, for instance, an exemplary handle bar in a forward position is provided according to an embodiment. As illustrated, forward configuration 400 includes handle bar 422 coupled to steering column 420, wherein handle bar 422 extends to a forward position substantially in front of the vertical position. Here, although some implementations of forward configuration 400 may require riders to steer by bending forward, as in conventional bicycles, riders may nevertheless prefer forward configuration 400 since straddling a bicycle frame is avoided. In an aspect, similar to handle bar 322 in vertical configuration 300, handle bar 422 may be configured to include "forearm rests" (not shown) to facilitate a more comfortable steering of forward configuration 400. In another aspect, handle bar 422 may be configured to wrap inward so as to provide a more stable steering mechanism.

Figure 5:
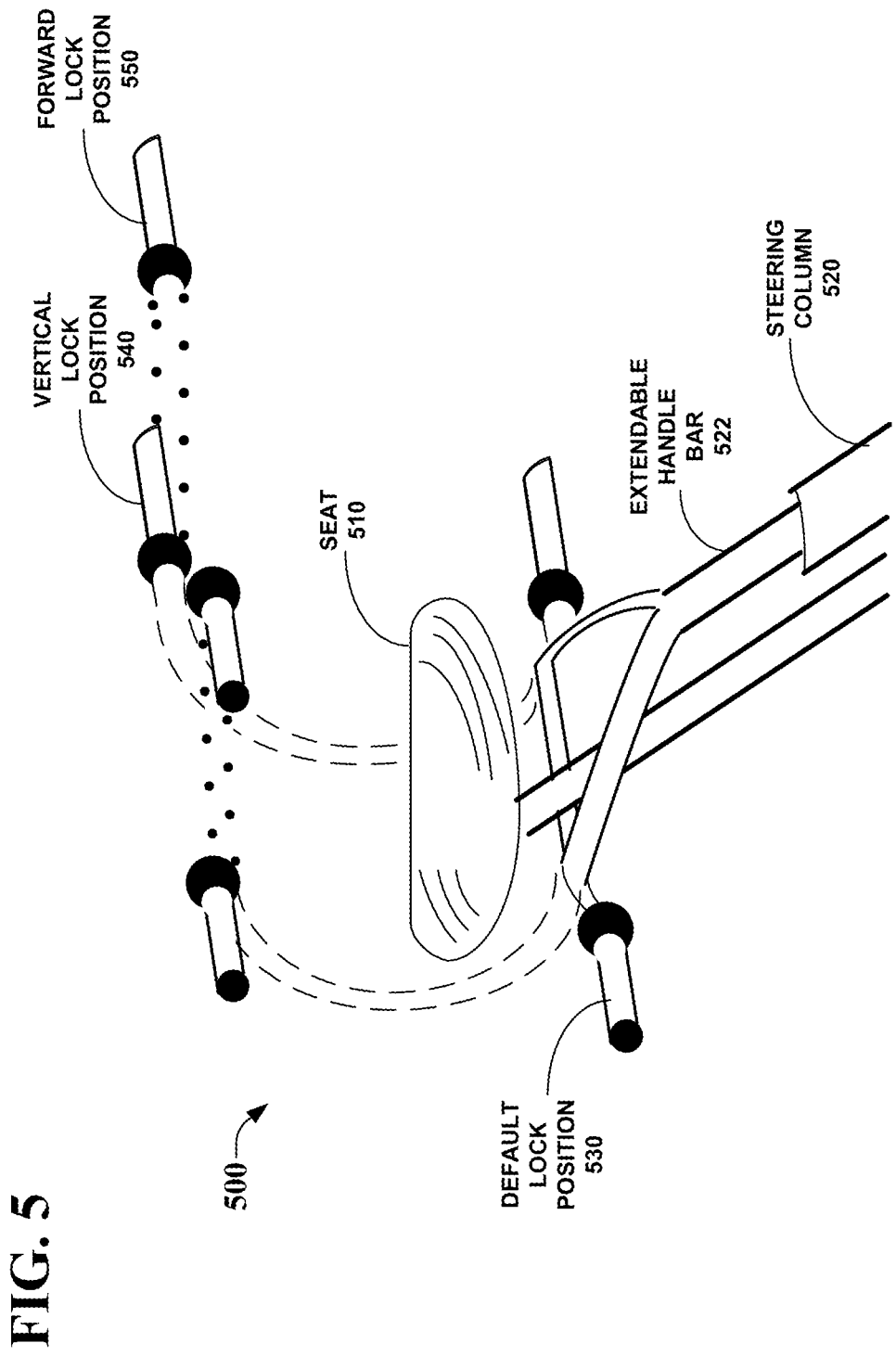
FIG. 5 illustrates an exemplary adjustable handle bar according to an embodiment.

It is further contemplated that, rather than interchanging multiple handle bars, a single adjustable handle bar can be utilized. Referring next to FIG. 5, an exemplary adjustable handle bar is provided according to an embodiment. As illustrated, adjustable configuration 500 includes extendable handle bar 522, which is extendable from steering column 520. Within such embodiment, handle bar 522 may comprise a locking mechanism, wherein the locking mechanism is configured to lock extendable handle bar 522 into any of a plurality of positions. For this particular example, extendable handle bar 522 is configured to lock into any of default lock position 530, vertical lock position 540, or forward lock position 550, as shown.

To this end, it should be noted that default lock position 530, vertical lock position 540, and forward lock position 550, are substantially analogous to default configuration 200, vertical configuration 300, and forward configuration 400, respectively. For instance, adjustable configuration 500 may be designed to facilitate locking extendable handle bar 522 into default lock position 530 behind a midpoint of seat 510, wherein extendable handle bar 522 is then configured to extend further from this default position proximate to seat 510.

In a particular embodiment, extendable handle bar 522 is configured to extend from a default position proximate to a rear portion of seat 510 into an extended position substantially above the default position, which may or may not extend in front of seat 510. For instance, as illustrated, adjustable configuration 500 may be designed to facilitate locking extendable handle bar 522 from default lock position 530 into vertical lock position 540. Adjustable configuration 500 may then be further designed to facilitate locking extendable handle bar 522 from vertical lock position 540 into forward lock position 550, wherein forward lock position 550 is substantially in front of a midpoint of seat 510, as shown.

Steering Column Coupling Embodiments

Various exemplary non-limiting embodiments are now disclosed for coupling a steering column to a frame. To this end, it is noted that the embodiments described herein are not intended to be exhaustive, and that one of ordinary skill will appreciate that various undisclosed embodiments also fall within the scope and spirit of the instant invention.

Figure 6:
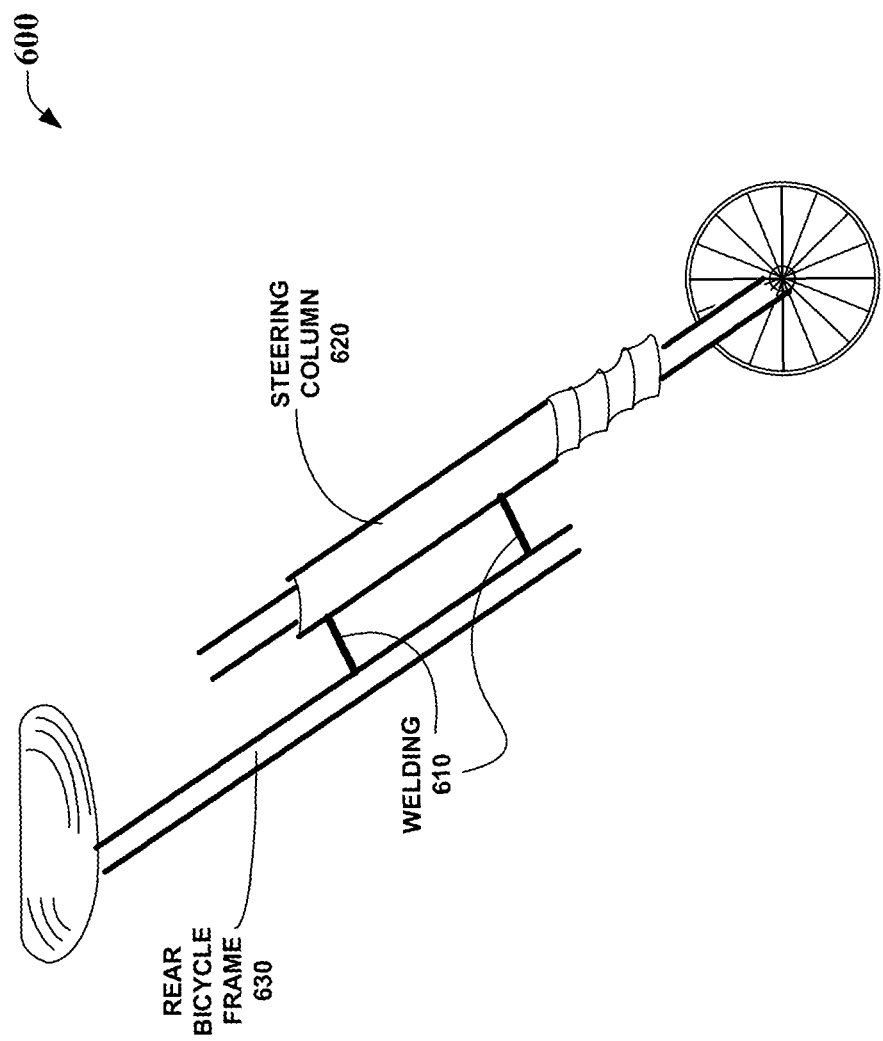
FIG. 6 illustrates an exemplary welding of a steering column to a rear bicycle frame according to an embodiment.

Referring next to FIG. 6 an exemplary welding of a steering column to a rear bicycle frame is illustrated according to an embodiment. Specifically, a coupling configuration 600 is shown, which includes steering column 620 and rear bicycle frame 630. Within such embodiment, steering column 620 is welded directly onto rear bicycle frame 630 via welding 610, which may provide a desirably stronger coupling of steering column 620 to rear bicycle frame 630. Indeed, welding 610 may be a particularly desirable coupling for specifications requiring a higher structural stress tolerance (e.g., specifications designed for rugged terrains).

Figure 7:
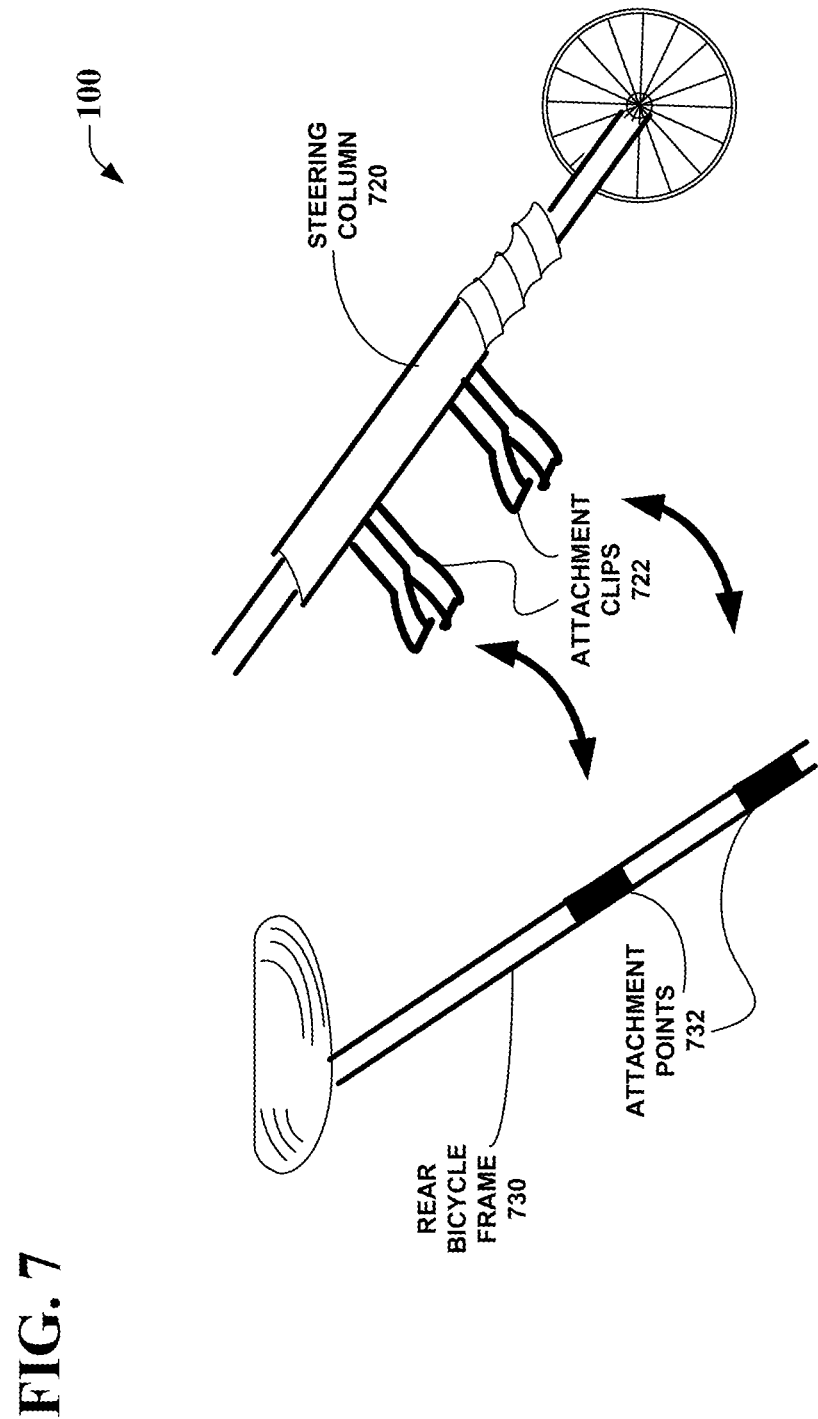
FIG. 7 illustrates an exemplary removable steering column according to an embodiment.

In an aspect, it is contemplated that multi-cycle apparatuses having various steering column designs may be desired for different people/uses. To facilitate such desirability, the multi-cycle apparatus disclosed herein may include a mechanism for interchanging different steering columns. Referring next to FIG. 7, an exemplary removable steering column is provided according to an embodiment. As illustrated, removable configuration 700 includes steering column 720 which is configured to detach from rear bicycle frame 730. For this particular embodiment, steering column 720 farther includes attachment clips 722, which attach to rear bicycle frame 730 via attachment points 732, as shown. For further stability, it should be appreciated that various aspects of removable configuration 700 can be modified. For instance, a slipping of attachment clips 722 away from attachment points 732 may be mitigated by including indentations at attachment points 732. Slipping may also be mitigated by modifying attachment clips 722 in any of a plurality of ways (e.g., including a tightening screw).

In other aspects, multi-cycle apparatus designs having various wheelbase widths are contemplated. To this end, it is noted that a desired wheelbase width may vary according to use and/or personal preference. For instance, riders wanting to race their multi-cycle apparatus may prefer a wider wheelbase to increase stability.

Figure 8:
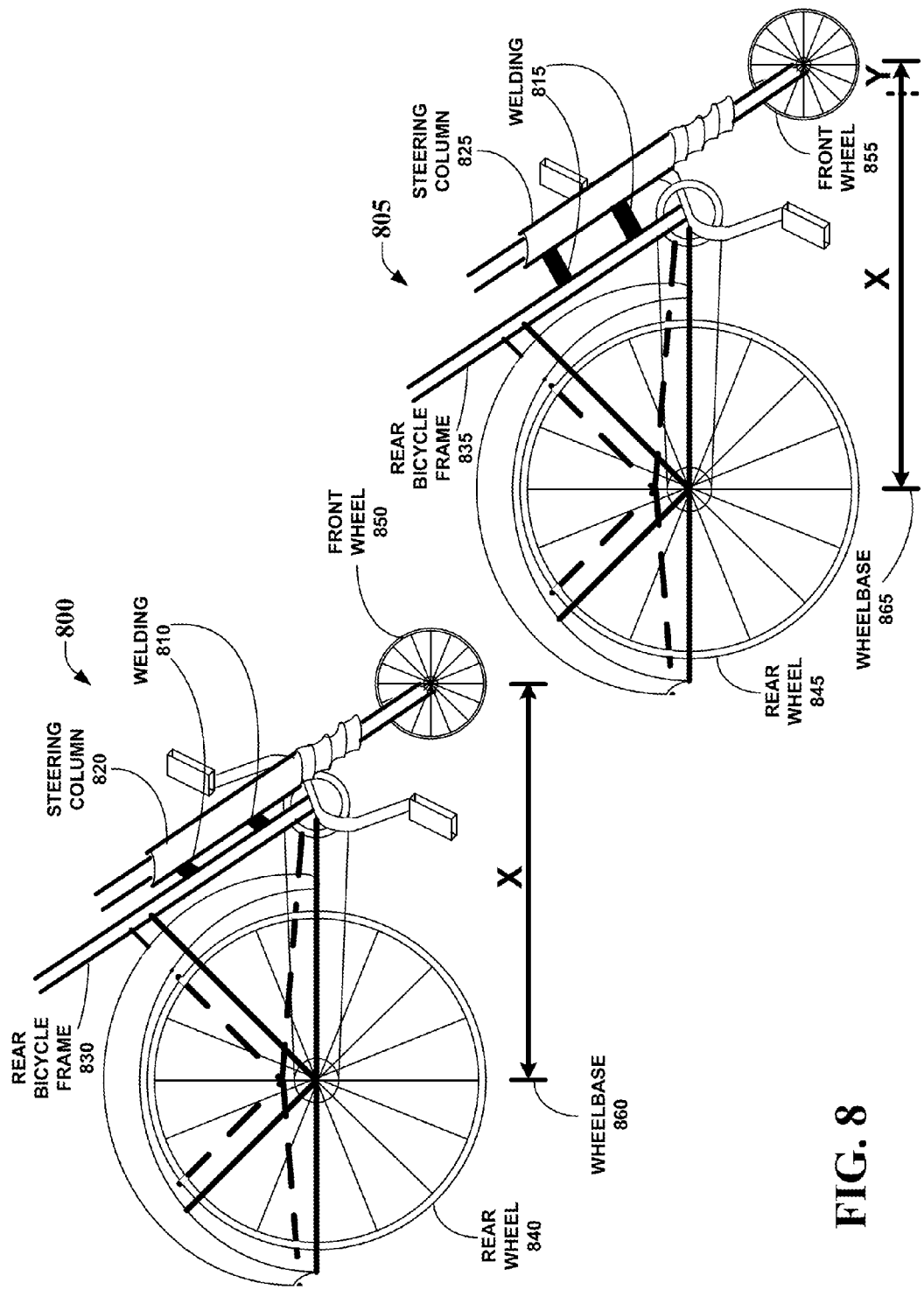
FIG. 8 is an illustration comparing exemplary bicycles having different wheelbase widths according to a welded steering column embodiment.

In FIG. 8 an illustration comparing exemplary bicycles having different wheelbase widths according to a welded steering column embodiment is provided. As illustrated, multi-cycle apparatus 800 is configured to have a wheelbase 860 between front wheel 850 and rear wheel 840 of "X" units, whereas multi-cycle apparatus 805 is configured to have a wider wheelbase 865 between front wheel 855 and rear wheel 845 of "X+Y" units. Here, it should be noted that differences in wheelbase widths may be achieved via differently sized welding couplings. For this particular embodiment, the width difference between wheelbase 860 and wheelbase 865 is a direct result of welding 815 being wider than welding 810.

Figure 9:
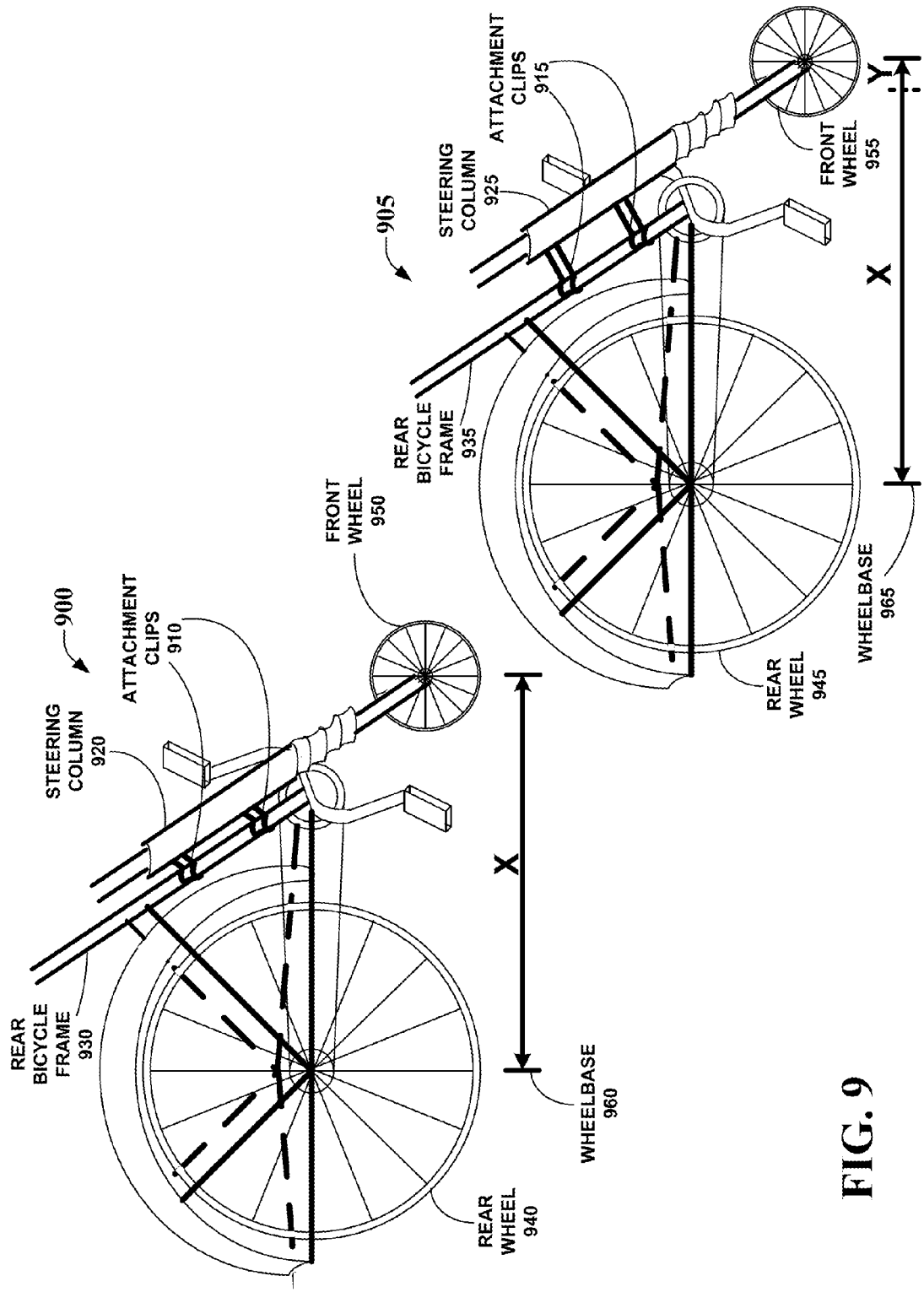
FIG. 9 is an illustration comparing exemplary bicycles having different wheelbase widths according to a removable steering column embodiment.

Variable wheelbase widths may also be implemented via embodiments having detachable steering columns In FIG. 9, for example, an illustration comparing exemplary bicycles having different wheelbase widths according to a removable steering column embodiment is provided. As illustrated, multi-cycle apparatus 900 is configured to have a wheelbase 960 between front wheel 950 and rear wheel 940 of "X" units, whereas multi-cycle apparatus 905 is configured to have a wider wheelbase 965 between front wheel 955 and rear wheel 945 of "X+Y" units. Here, it should be noted that differences between wheelbase widths may be achieved by interchanging attachment clips and/or steering columns. For this particular embodiment, the width difference between wheelbase 960 and wheelbase 965 is a direct result of attachment clips 915 being wider than attachment clips 910.

Figure 10:
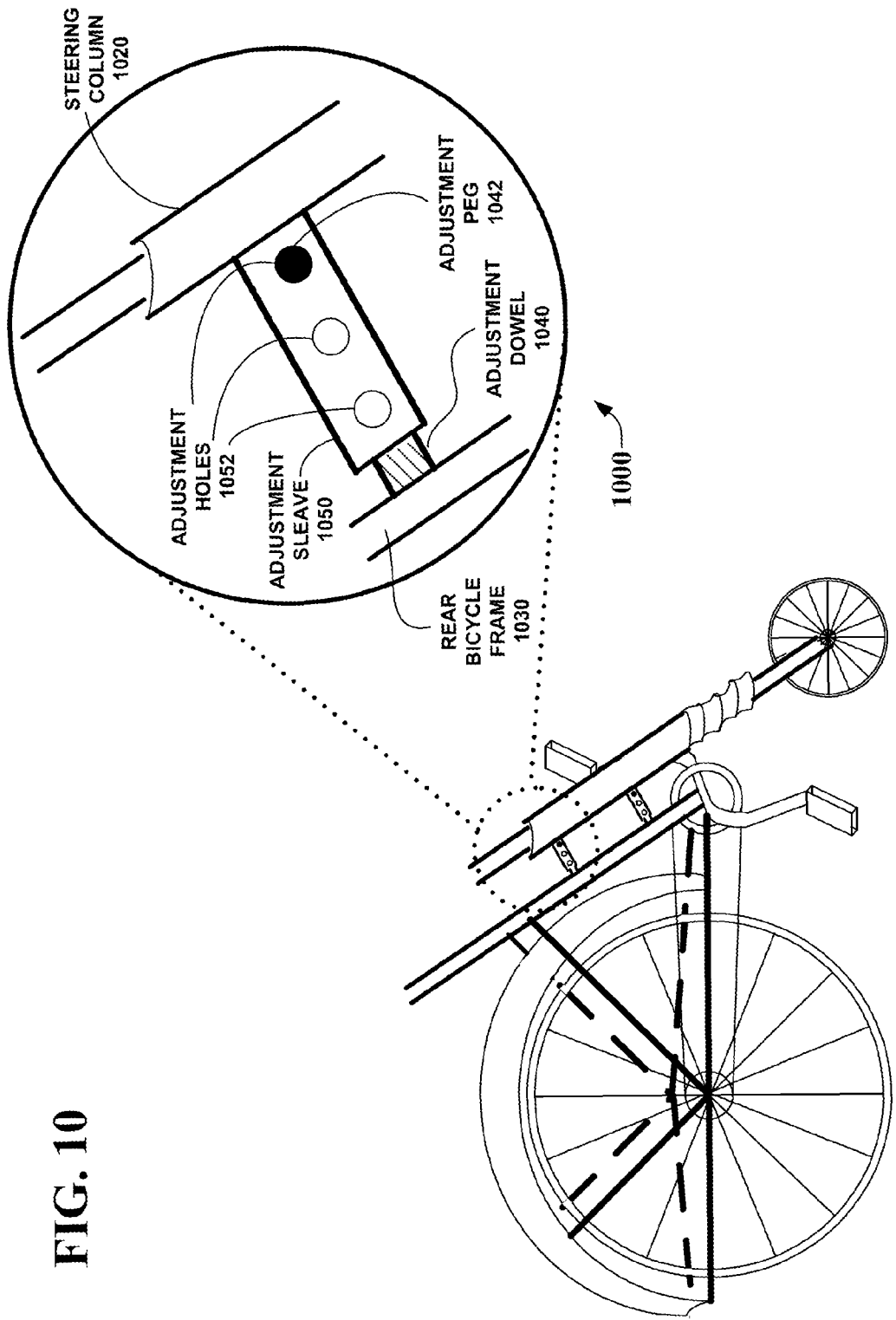
FIG. 10 illustrates an exemplary locking mechanism for facilitating an adjustable wheelbase according to an embodiment.

In an aspect, rather than selecting from different "welded" configurations and/or interchanging attachment clips, a single multi-cycle apparatus having an adjustable wheelbase design is contemplated. Referring next to FIG. 10, an exemplary locking mechanism for facilitating an adjustable wheelbase design according to an embodiment is provided. As illustrated, locking mechanism 1000 is configured to lock the wheel base into any of a plurality of positions. For this particular embodiment, rear bicycle frame 1030 includes adjustment dowel 1040, and steering column 1020 includes adjustment sleeve 1050, wherein adjustment dowel 1040 is configured to mate with adjustment sleeve 1050. Specifically, adjustment dowel 1040 includes adjustment peg 1042, which is configured to lock into any of adjustment holes 1052 on adjustment sleeve 1050, wherein each of adjustment holes 1052 correspond to a different wheelbase width.

Figure 11:
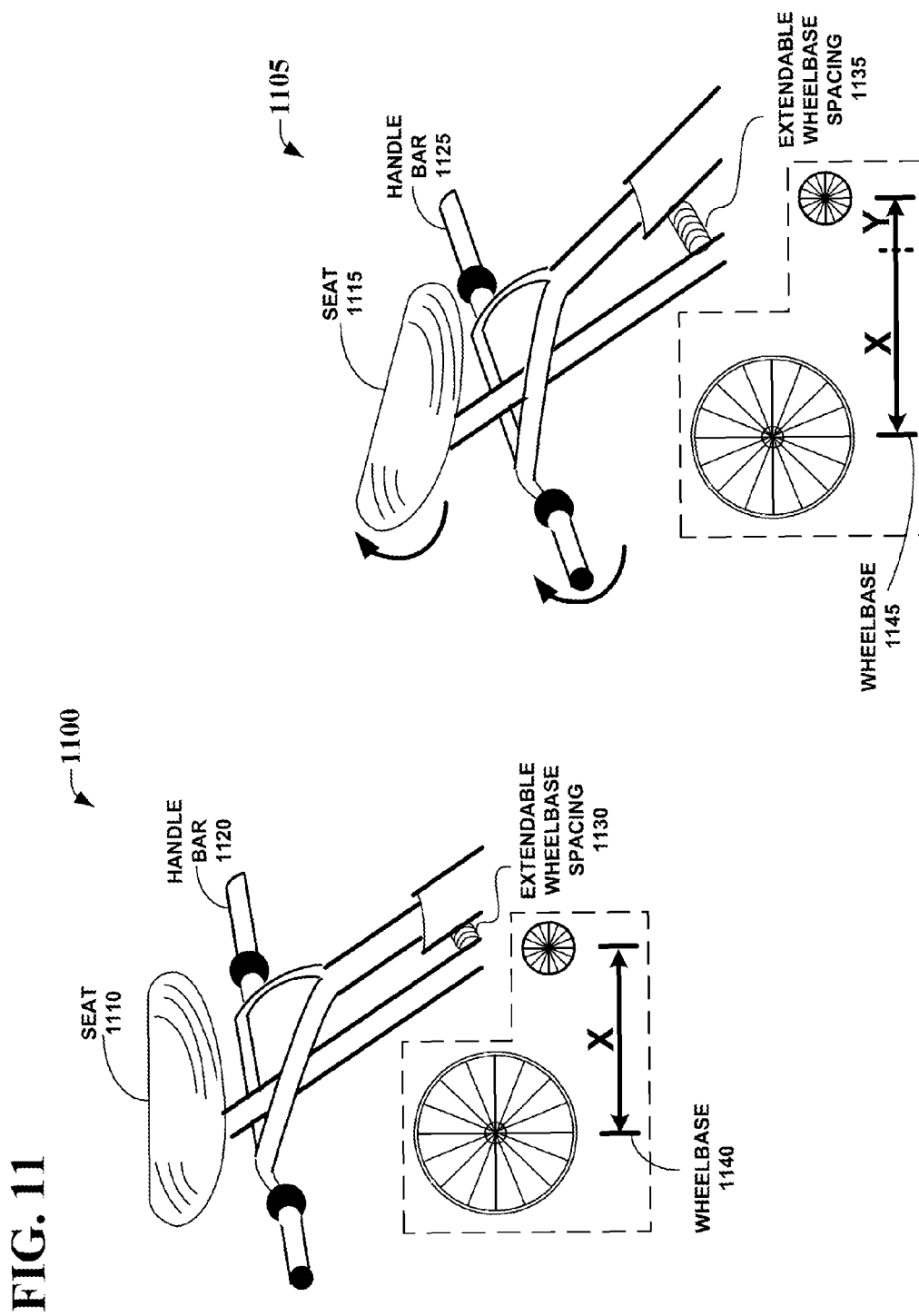
FIG. 11 illustrates an exemplary extendable wheelbase mechanism according to an embodiment.

In yet another aspect, it is contemplated that wheelbase adjustments may be desired while the multi-cycle apparatus is in motion. In FIG. 11, for instance, an exemplary extendable wheelbase mechanism is shown according to an embodiment. As illustrated, non-extended multi-cycle apparatus 1100 is configured to have a wheelbase 1140 of "X" units, whereas extended multi-cycle apparatus 1105 is configured to have a wider wheelbase 1145 of "X+Y" units. Here, it should be noted that non-extended multi-cycle apparatus 1100 is configured to vary wheelbase 1140 by extending extendable wheelbase spacing 1130 via any of a plurality of mechanisms. For this particular embodiment, a mechanism is disclosed whereby extendable wheelbase spacing 1130 expands (i.e., wherein wheelbase 1140 is increased) in response to a tilting of seat 1110 and/or a rotation of handle bars 1120. Namely, as shown with respect to extended multi-cycle apparatus 1105, a tilting of seat 1115 and/or a rotation of handle bars 1125 can result in an expansion of extendable wheelbase spacing 1135 being extended (i.e., yielding wheelbase 1145). Furthermore, although not shown here, it is contemplated that extendable wheelbase spacing 1135 can be configured to contract back to its original un-extended state (i.e., the state shown for extendable wheelbase spacing 1130) via a tilting of seat 1115 and/or a rotation of handle bars 1125 in an opposite direction.

Exemplary Electrical configurations

Various exemplary non-limiting embodiments are now disclosed for electrical components that may be included within the multi-cycle apparatus described herein. To this end, it is noted that the embodiments described herein are not intended to be exhaustive, and that one of ordinary skill will appreciate that various undisclosed embodiments also fall within the scope and spirit of the instant invention.

Figure 12:
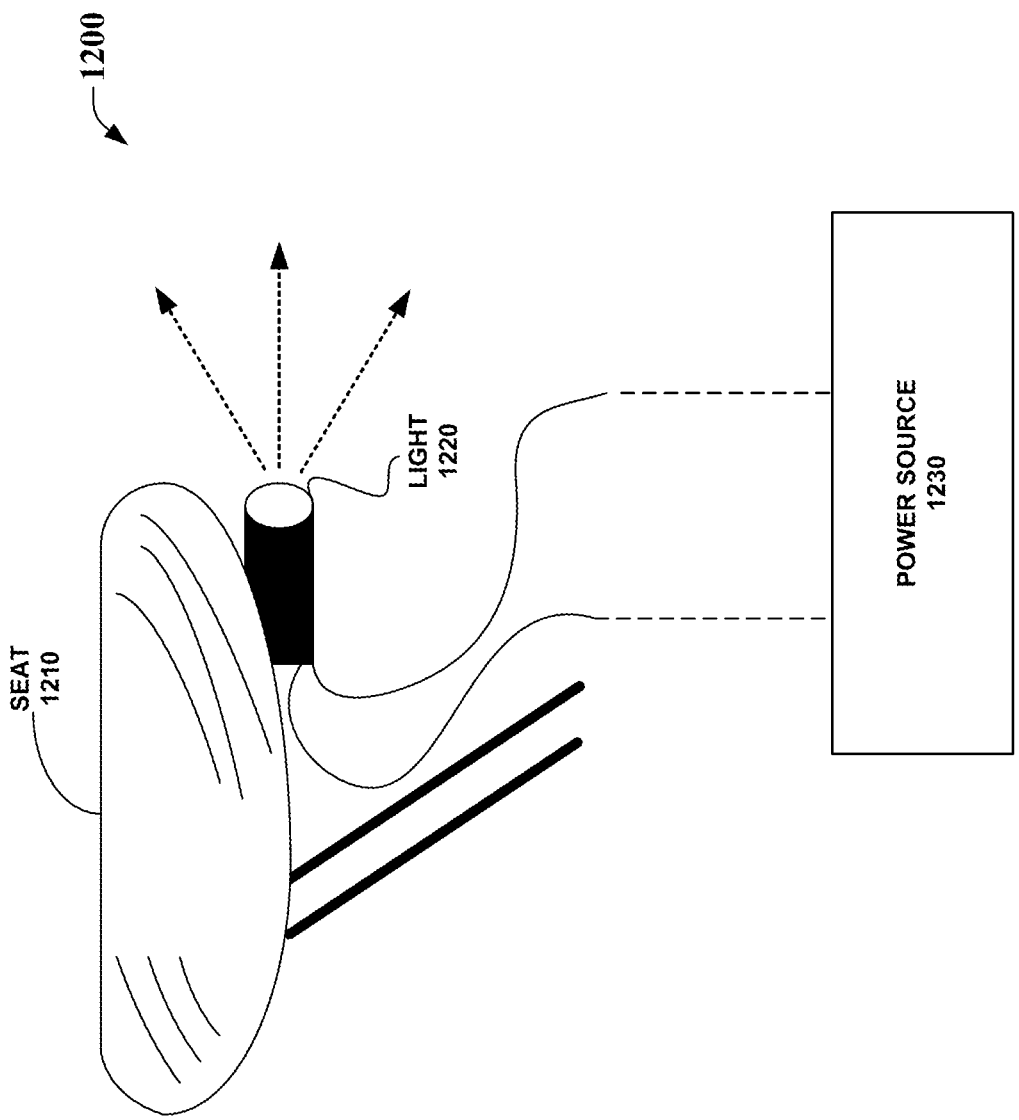
FIG. 12 illustrates an exemplary frontal light coupled to a power source according to an embodiment.

In an aspect, a novel frontal light configuration is contemplated, as shown in FIG. 12. As illustrated, configuration 1200 includes light 1220 attached beneath seat 1210 and electrically coupled to power source 1230. Here, it should be noted that attaching a light beneath the seat of conventional bicycles is not practical since the area directly in front of a conventional bicycle's seat is obstructed by the bicycle's steering mechanism. Lights in conventional bicycles are therefore usually attached to the steering column. Here, however, since an apparatus having a centralized steering mechanism is disclosed, the area directly in front of seat 1210 is substantially unobstructed. Accordingly, the novel placing of light 1220 beneath seat 1210 is both practical and desirable.

With respect to power source 1230, it should be noted that any of a plurality of known power sources can be used (e.g., a conventional battery) and that power source 1230 can be affixed anywhere on the disclosed multi-cycle apparatus (e.g., steering column, seat, frame, etc.). It should be further noted that, although power source 1230 is only shown connected to light 1220, it is contemplated that power source 1230 could provide power to any of a plurality of electrical components in addition to, or instead of, light 1220 (e.g., a computing device, navigation device, radio, etc.).

Figure 13:
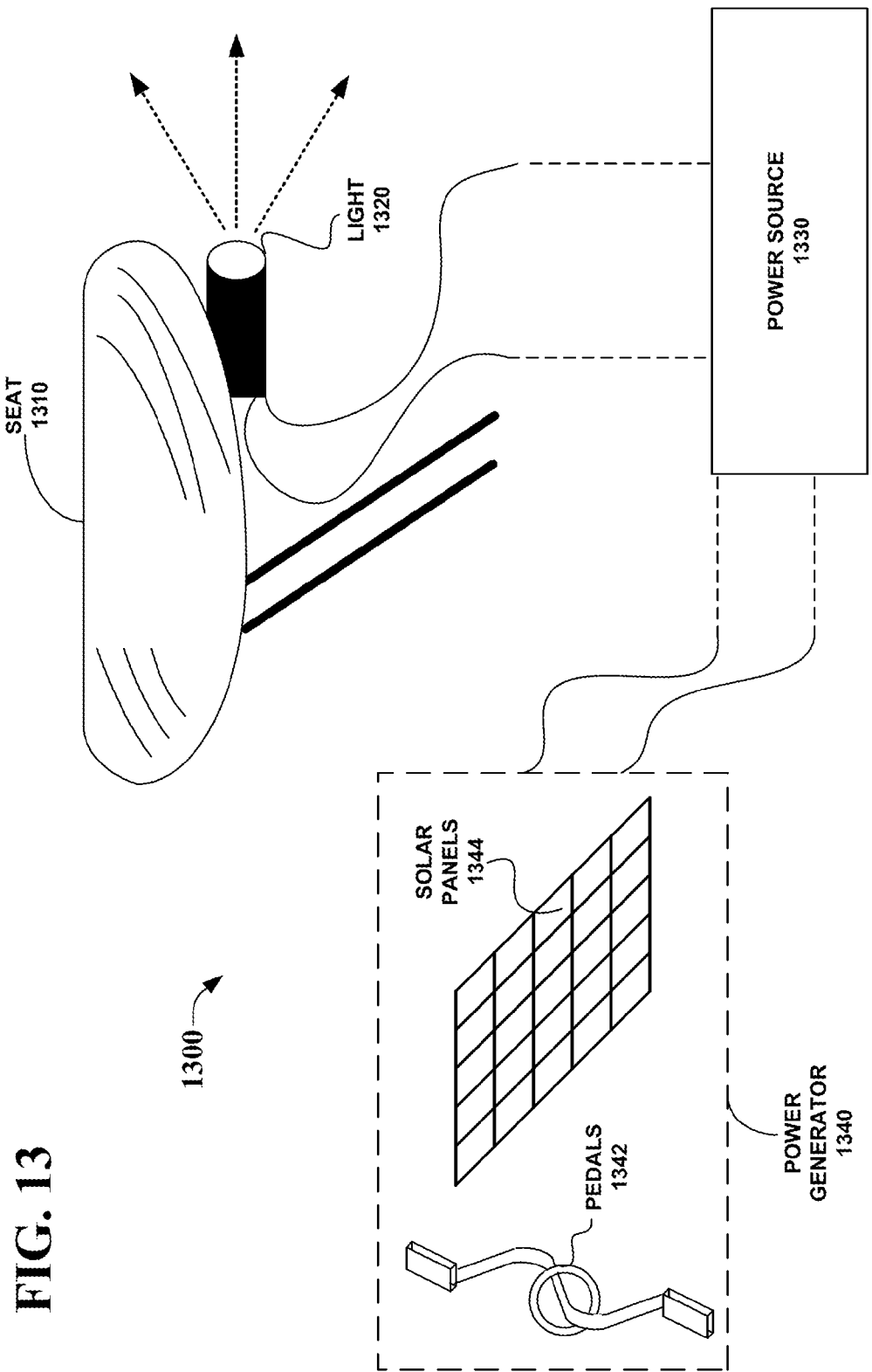
FIG. 13 illustrates an exemplary coupling of a power source to a power generator according to an embodiment.

In another aspect, power generating configurations are also contemplated. Referring next to FIG. 13, an exemplary coupling of a power source to a power generator is illustrated according to an embodiment. Here, similar to configuration 1200, configuration 1300 includes light 1320 attached beneath seat 1310 and electrically coupled to power source 1330. However, for this particular embodiment, power source 1330 is charged/recharged by power generator 1340. To this end, it is noted that any of a plurality of power generating mechanisms can be implemented. For instance, power generator 1340 may include pedals 1342 and/or solar panels 1344, wherein pedals 1342 facilitate generating power from a rider's peddling, and wherein solar panels 1344 facilitate generating power via photovoltaic cells.

Figure 14:
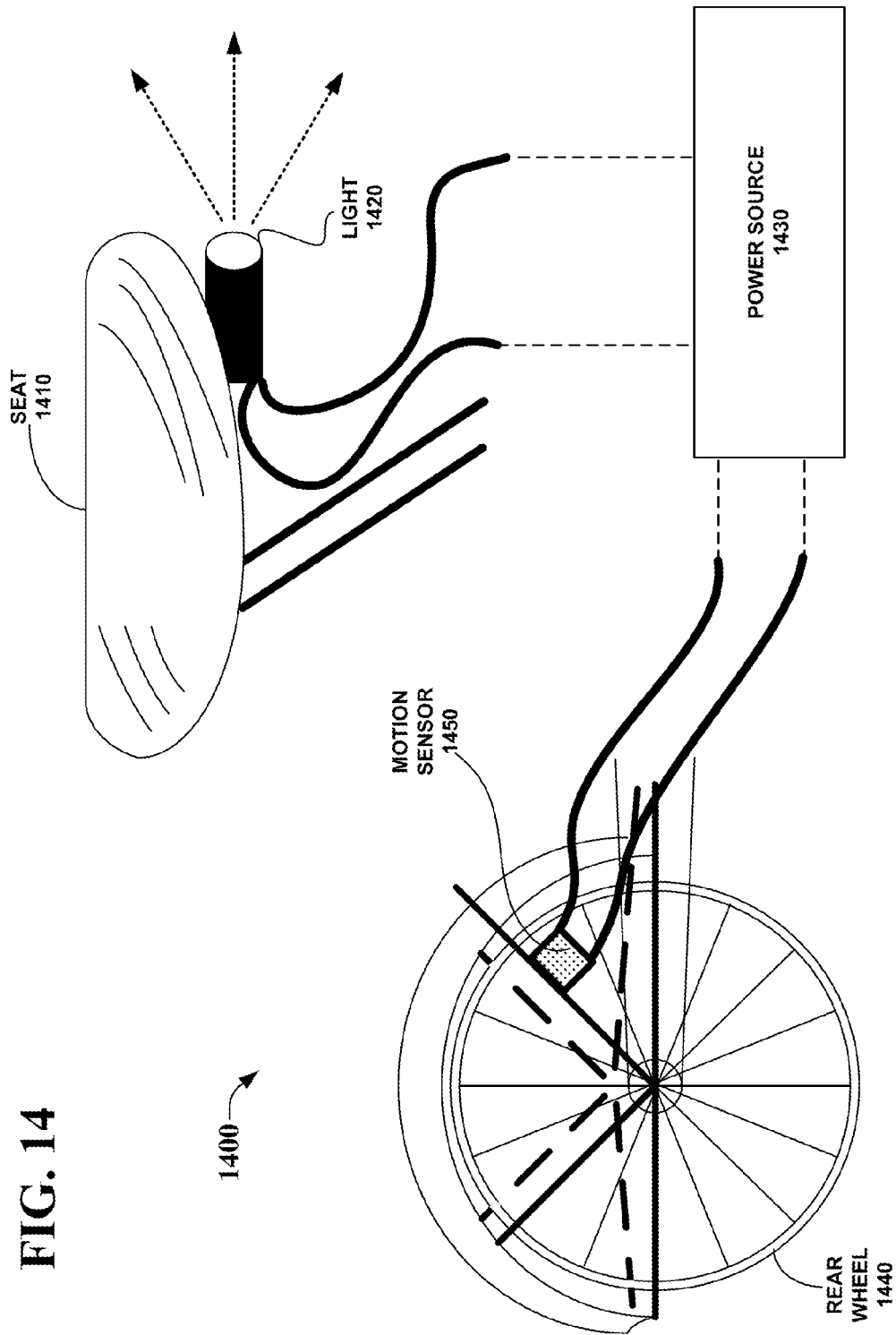
FIG. 14 illustrates an exemplary coupling of a power source to a motion sensor according to an embodiment.

In yet another aspect, rather than requiring riders to turn a switch to power electrical components, a motion-triggered apparatus is contemplated. In FIG. 14, for instance, an exemplary coupling of a power source to a motion sensor according to an embodiment is illustrated. Here, similar to configuration 1200 and configuration 1300, configuration 1400 includes light 1420 attached beneath seat 1410 and electrically coupled to power source 1430. For this particular embodiment, however, configuration 1400 includes motion sensor 1450 which is configured to sense a motion of rear wheel 1440. Upon sensing a motion of rear wheel 1440, motion sensor 1450 may be configured to trigger a switch on power source 1430, which provides power to the various electrical components of the multi-cycle apparatus. Furthermore, it should be noted that although motion sensor 1450 is shown here as attached to rear wheel 1440 and configured to monitor a motion of rear wheel 1440, one of ordinary skill will appreciate that motion sensor 1450 can be attached anywhere on the multi-cycle apparatus (e.g., a front wheel) and configured to monitor a motion of any component. It should also be noted that any of various non-motion sensors can be utilized to trigger power source 1430 (e.g., a heat sensor configured to sense the presence of a rider, a pressure sensor configured to sense a pressure applied to a seat, etc.).

Exemplary Networked and Distributed Environments

One of ordinary skill in the art can appreciate that various embodiments for implementing the use of a computing device (e.g., computing device 128 in FIG. 1) and related embodiments described herein can be implemented in connection with any computer or other client or server device, which can be deployed as part of a computer network or in a distributed computing environment, and can be connected to any kind of data store. Moreover, one of ordinary skill in the art will appreciate that such embodiments can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

FIG. 14 provides a non-limiting schematic diagram of an exemplary networked or distributed computing environment. The distributed computing environment comprises computing objects or devices 1410, 1412, etc. and computing objects or devices 1420, 1422, 1424, 1426, 1428, etc., which may include programs, methods, data stores, programmable logic, etc., as represented by applications 1430, 1432, 1434, 1436, 1438. It can be appreciated that computing objects or devices 1410, 1412, etc. and computing objects or devices 1420, 1422, 1424, 1426, 1428, etc. may comprise different devices, such as PDAs (personal digital assistants), audio/video devices, mobile phones, MP3 players, laptops, etc.

Each computing object or device 1410, 1412, etc. and computing objects or devices 1420, 1422, 1424, 1426, 1428, etc. can communicate with one or more other computing objects or devices 1410, 1412, etc. and computing objects or devices 1420, 1422, 1424, 1426, 1428, etc. by way of the communications network 1440, either directly or indirectly. Even though illustrated as a single element in FIG. 14, network 1440 may comprise other computing objects and computing devices that provide services to the system of FIG. 14, and/or may represent multiple interconnected networks, which are not shown. Each computing object or device 1410, 1412, etc. or 1420, 1422, 1424, 1426, 1428, etc. can also contain an application, such as applications 1430, 1432, 1434, 1436, 1438, that might make use of an API (application programming interface), or other object, software, firmware and/or hardware, suitable for communication with or implementation of an infrastructure for information as a service from any platform as provided in accordance with various embodiments.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Thus, a host of network topologies and network infrastructures, such as client/server, peer-to-peer, or hybrid architectures, can be utilized. In a client/server architecture, particularly a networked system, a client is usually a computer that accesses shared network resources provided by another computer, e.g., a server. In the illustration of FIG. 14, as a non-limiting example, computing objects or devices 1420, 1422, 1424, 1426, 1428, etc. can be thought of as clients and computing objects or devices 1410, 1412, etc. can be thought of as servers where computing objects or devices 1410, 1412, etc. provide data services, such as receiving data from computing objects or devices 1420, 1422, 1424, 1426, 1428, etc., storing of data, processing of data, transmitting data to computing objects or devices 1420, 1422, 1424, 1426, 1428, etc., although any computer can be considered a client, a server, or both, depending on the circumstances. Any of these computing devices may be processing data, or requesting services or tasks that may implicate an infrastructure for information as a service from any platform and related techniques as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the user profiling can be provided standalone, or distributed across multiple computing devices or objects.

In a network environment in which the communications network/bus 1440 is the Internet, for example, the computing objects or devices 1410, 1412, etc. can be Web servers with which the computing objects or devices 1420, 1422, 1424, 1426, 1428, etc. communicate via any of a number of known protocols, such as HTTP. As mentioned, computing objects or devices 1410, 1412, etc. may also serve as computing objects or devices 1420, 1422, 1424, 1426, 1428, etc., or vice versa, as may be characteristic of a distributed computing environment.

Exemplary Computing Device

As mentioned, various embodiments described herein apply to any device wherein it may be desirable to include a computing device to a multi-cycle apparatus. It is understood, therefore, that handheld, portable and other computing devices and computing objects of all kinds are contemplated for use in connection with the various embodiments described herein, i.e., anywhere that a device may provide some functionality in connection with a multi-cycle apparatus. Accordingly, the below general purpose remote computer described below in FIG. 15 is but one example, and the embodiments of the subject disclosure may be implemented with any client having network/bus interoperability and interaction.

Although not required, any of the embodiments can partly be implemented via an operating system, for use by a developer of services for a device or object, and/or included within application software that operates in connection with the operable component(s). Software may be described in the general context of computer executable instructions, such as program modules, being executed by one or more computers, such as client workstations, servers or other devices. Those skilled in the art will appreciate that network interactions may be practiced with a variety of computer system configurations and protocols.

Figure 15:
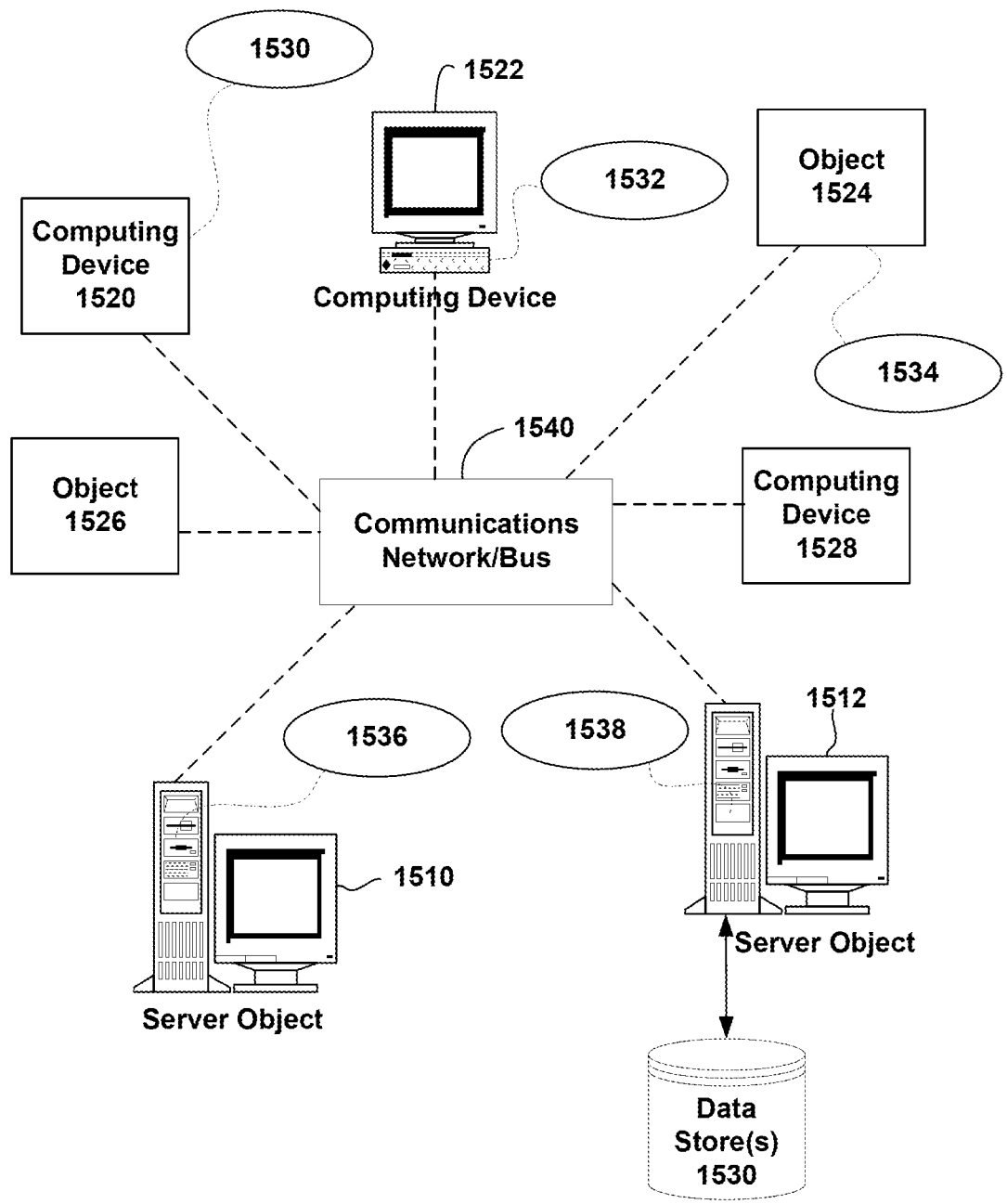
FIG. 15 is a block diagram representing exemplary non-limiting networked environments in which various embodiments described herein can be implemented.
Figure 16:
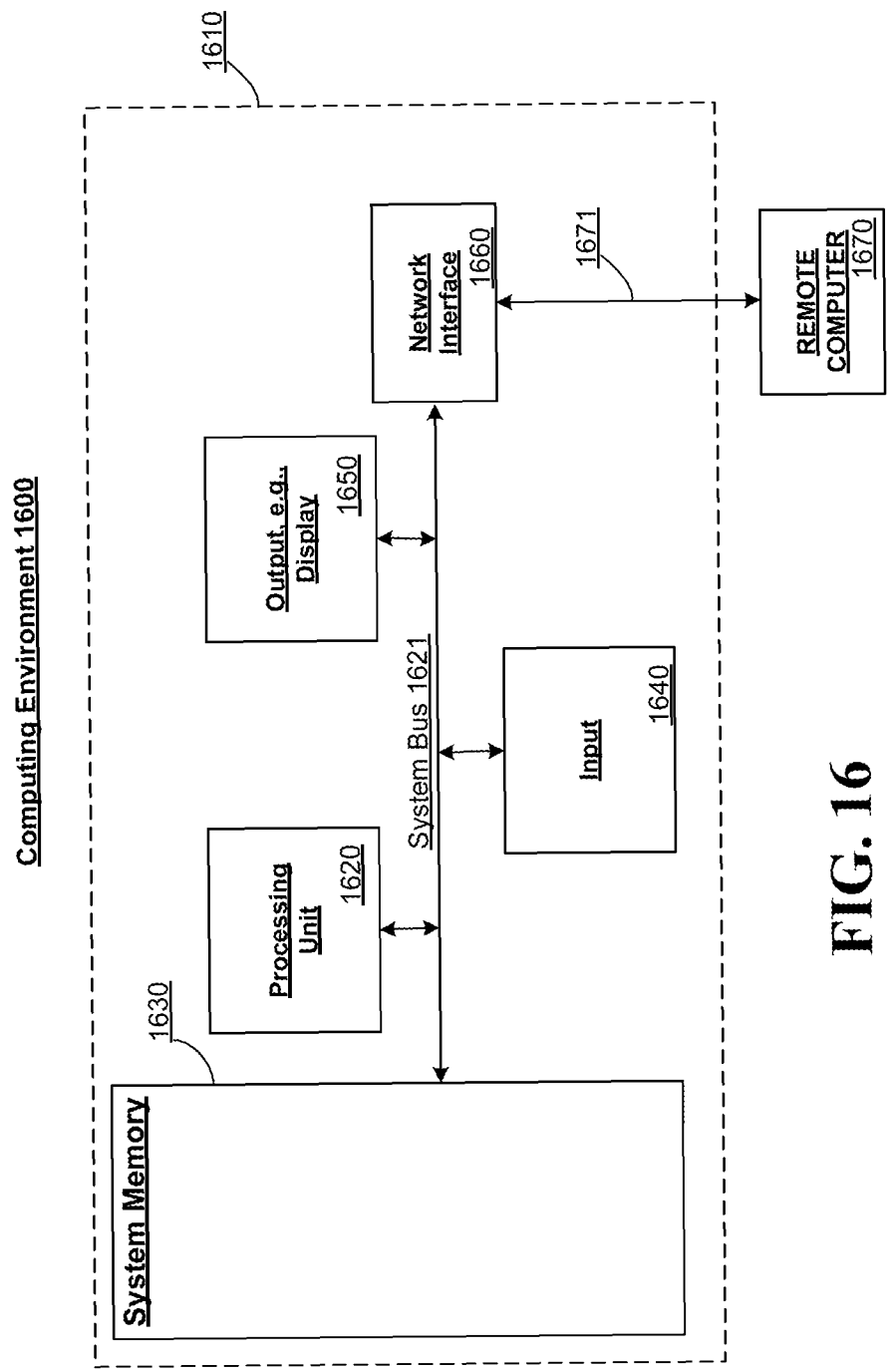
FIG. 16 is a block diagram representing an exemplary non-limiting computing system or operating environment in which one or more aspects of various embodiments described herein can be implemented.

FIG. 15 thus illustrates an example of a suitable computing system environment 1500 in which one or more of the embodiments may be implemented, although as made clear above, the computing system environment 1500 is only one example of a suitable computing environment and is not intended to suggest any limitation as to the scope of use or functionality of any of the embodiments. The computing environment 1500 is not to be interpreted as having any dependency or requirement relating to any one or combination of components illustrated in the exemplary operating environment 1500.

With reference to FIG. 15, an exemplary remote device for implementing one or more embodiments herein can include a general purpose computing device in the form of a handheld computer 1510. Components of handheld computer 1510 may include, but are not limited to, a processing unit 1520, a system memory 1530, and a system bus 1521 that couples various system components including the system memory to the processing unit 1520.

Computer 1510 typically includes a variety of computer readable media and can be any available media that can be accessed by computer 1510. The system memory 1530 may include computer storage media in the form of volatile and/or nonvolatile memory such as read only memory (ROM) and/or random access memory (RAM). By way of example, and not limitation, memory 1530 may also include an operating system, application programs, other program modules, and program data.

A user may enter commands and information into the computer 1510 through input devices 1540 A monitor or other type of display device is also connected to the system bus 1521 via an interface, such as output interface 1550. In addition to a monitor, computers may also include other peripheral output devices such as speakers and a printer, which may be connected through output interface 1550.

The computer 1510 may operate in a networked or distributed environment using logical connections to one or more other remote computers, such as remote computer 1570. The remote computer 1570 may be a personal computer, a server, a router, a network PC, a peer device or other common network node, or any other remote media consumption or transmission device, and may include any or all of the elements described above relative to the computer 1510. The logical connections depicted in FIG. 15 include a network 1571, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices, networks and advertising architectures, the underlying concepts may be applied to any network system and any computing device or system in which it is desirable to publish, build applications for or consume data in connection with interactions with a cloud or network service.

There are multiple ways of implementing one or more of the embodiments described herein, e.g., an appropriate API, tool kit, driver code, operating system, control, standalone or downloadable software object, etc. which enables applications and services to use the infrastructure for information as a service from any platform. Embodiments may be contemplated from the standpoint of an API (or other software object), as well as from a software or hardware object that facilitates provision of an infrastructure for information as a service from any platform in accordance with one or more of the described embodiments. Various implementations and embodiments described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter can be appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

While in some embodiments, a client side perspective is illustrated, it is to be understood for the avoidance of doubt that a corresponding server perspective exists, or vice versa. Similarly, where a method is practiced, a corresponding device can be provided having storage and at least one processor configured to practice that method via one or more components.

While the various embodiments have been described in connection with the preferred embodiments of the various figures, it is to be understood that other similar embodiments may be used or modifications and additions may be made to the described embodiment for performing the same function without deviating there from. Still further, one or more aspects of the above described embodiments may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A multi-cycle apparatus, comprising:
   a seat;
   a steering column, wherein the steering column is substantially below the seat; and
   a handle bar coupled to the steering column, wherein at least a portion of the handle bar extends behind a midpoint of the seat, and wherein the handle bar is configured to steer the multi-cycle apparatus via the steering column.

2. The multi-cycle apparatus according to claim 1, wherein the handle bar is extendable from a default position proximate to the seat.

3. The multi-cycle apparatus according to claim 2, wherein the handle bar comprises a locking mechanism, and wherein the locking mechanism is configured to lock the handle bar in a plurality of positions.

4. The multi-cycle apparatus according to claim 3, wherein the locking mechanism is configured to lock the handle bar in an extended position, and wherein the extended position is substantially above the default position and extends in front of the seat.

5. The multi-cycle apparatus according to claim 1, further comprising a front wheel coupled to the steering column, wherein the steering column is coupled to a frame, and wherein a wheel base between the front wheel and a rear wheel is adjustable via a coupling of the steering column to the frame.

6. The multi-cycle apparatus according to claim 5, wherein the coupling comprises a locking mechanism, and wherein the locking mechanism is configured to lock the wheel base in a plurality of positions.

7. The multi-cycle apparatus according to claim 1, further comprising a shock absorber positioned between the front wheel and the steering column.

8. A bicycle apparatus, comprising:
   a rear bicycle frame;
   a steering column coupled to the rear bicycle frame, wherein the steering column is positioned substantially under a seat attached to the rear bicycle frame; and
   a handle bar extending from the steering column, wherein the handle bar wraps around a rear portion of the seat, and wherein the handle bar is configured to steer the bicycle apparatus via the steering column.

9. The bicycle apparatus of claim 8, wherein the steering column is configured to detach from the rear bicycle frame.

10. The bicycle apparatus of claim 8, wherein the steering column is welded to the rear bicycle frame.

11. The bicycle apparatus of claim 8, wherein the handle bar is configured to extend from a default position proximate to the rear portion of the seat.

12. The bicycle apparatus of claim 11, wherein the handle bar is configured to extend vertically from the default position.

13. The bicycle apparatus of claim 11, wherein the handle bar is configured to wrap inward.

14. A bicycle apparatus, comprising:
   a rear bicycle frame;
   a steering column coupled to the rear bicycle frame, wherein the steering column is substantially positioned directly below a seat attached to the rear bicycle frame; and a handle bar coupled to the steering column, wherein at least a portion of the handle bar extends behind a midpoint of the seat, and wherein the handle bar is configured to steer the bicycle apparatus via the steering column.

15. The bicycle apparatus according to claim 14, wherein the handle bar is extendable from the steering column.

16. The bicycle apparatus according to claim 15, wherein the handle bar comprises a locking mechanism, and wherein the locking mechanism is configured to lock the handle bar in a default position behind the midpoint of the seat.

17. The bicycle apparatus according to claim 16, wherein the locking mechanism is configured to lock the handle bar in a forward position, and wherein the forward position is in front of the midpoint of the seat.

18. The bicycle apparatus according to claim 14, further comprising a light attached underneath the seat, wherein the light is configured to illuminate an area in front of the seat.

19. The bicycle apparatus according to claim 18, further comprising a motion sensor configured to trigger an illumination of the light, wherein the illumination is triggered when the motion sensor senses a motion of a wheel.

20. The bicycle apparatus according to claim 18, further comprising a power generator configured to provide a power source to the light, wherein the power source is energized from a motion of a wheel.

\* \* \* \* \*